Patented July 28, 1925.

1,547,515

UNITED STATES PATENT OFFICE.

JOHN R. MURLIN, OF ROCHESTER, NEW YORK.

ANTIDIABETIC SUBSTANCE AND METHOD OF PREPARING THE SAME.

No Drawing.   Application filed July 9, 1923. Serial No. 650,489.

*To all whom it may concern:*

Be it known that I, JOHN R. MURLIN, a citizen of the United States, and resident of Rochester, in the county of Monroe and State of New York, have invented certain new and useful Improvements in Antidiabetic Substances and Methods of Preparing the Same, of which the following is a specification.

The present invention relates to an antidiabetic substance and to a method of preparing the same. An object of the invention is to prepare from pancreas of freshly-killed animals an anti-diabetic substance for administration to human beings as a treatment for diabetes mellitus.

In carrying out this invention perfectly fresh organs from slaughter-house animals, preferably the pig and steer, are obtained and the extraneous tissues are removed. The first step is to arrest at once the digestive action of trypsin. In carrying out this step it is preferred to immediately cut the organs up into small pieces and immediately subject them to an acid solution as well as a chilling or freezing action. The acid solution preferably employed consists of 0.2 normal hydrochloric acid in water and the chilling is carried approximately to freezing point or the material may be frozen solid. After a period of time in the acid solution (long enough to permit complete penetration of the acid and to thoroughly chill the tissue), the material is finely divided as by being passed through a meat grinder or being pulverized if in a frozen mass, the finely divided material being placed into a fresh quantity of acid solution.

The next step is the extraction of the anti-diabetic substance. This is preferably accomplished by a continuous movement of the acid solution through the macerated tissue, this result being secured by what is called reverse percolation, in which the macerated tissue is placed in a large percolator and the acidulated water heated preferably 50° C. is passed upwardly through the percolator from the top of the macerated tissue. Pressure for this movement may be supplied by gravity through the provision of a tank of the acidulated water placed at an approximate height above the percolator. The result is the fluid issuing from the top of the percolator is reheated and again carried upwardly through the macerated tissue, this being repeated as many times as it is necessary to obtain a maximum extraction of the desirable matter. For some unexplained reason the fluid passing through the macerated tissue in this way is found to contain a much smaller percentage of proteins and a larger amount of active substance than when extraction is carried out by ordinary methods. The apparatus which may be employed for handling the fluid during the extraction may consist, in addition to the percolator, of a warming tank arranged at a lower level than the percolator to heat the fluid and an elevated supply tank for the percolator to which the fluid may be forced by air pressure from the warming tank. It is essential, however, that this apparatus be constructed so that fluid does not come in contact with metal.

The next step, after the extraction of the fluid, is its purification. This is effected, in this instance, first by the neutralization of practically all the free acid in the fluid by means of a concentrated solution of pure sodium hydrate. The optimum end point of neutralization by titration lies between $p$H of 7.0 and 4.1, depending upon the amount of proteins present. For percolates made as described above it lies at $p$H 7. This throws down a heavy percentage of proteins which is removed preferably by filtration. The resulting filtrate is light amber in color and contains all the anti-diabetic substance. This first filtrate can be administered to the diabetic patient by mouth as a broth. It has a pleasant, meaty and distinctly salty taste not unlike the flavor of beef broth. It serves as positive protection against the diabetic disability. By drying it can be made into tablets or lozenges.

Further purification of the extract may be accomplished in the following manner: The first filtrate is treated with 250–350 grams of sodium chloride per liter of fluid and stirred to complete solution of the salt or to complete saturation. This has the effect of throwing down as a heavy white precipitate the proteins and the anti-diabetic substance. The precipitate is removed by filtration or centrifugation and may at this stage be dried, and pressed into tablets or be placed in gelatin capsules for oral administration. For parenteral administration (subcutaneous, intravenous, or intraperitoneal) however, it must be still further purified.

To that end the salt precipitate may be dissolved in alcohol preferably 70% of pure ethyl alcohol (or ethyl alcohol containing 5% methyl) and thereafter filtered. The anti-diabetic substance goes into solution. The salt is removed by successive solution in preferably 80% alcohol and the removal of the alcohol by distillation to dryness. The anti-diabetic substance is left in the distilling flask as a dry residue insoluble in water. The reaction however is strongly acid. The residue is suspended in sterile water and filtered aseptically. The anti-diabetic substance goes through the filter paper as a turbid solution. The reaction is now adjusted to a $p$H of 4.1, whereupon the anti-diabetic substance is precipitated and may be removed by aseptic filtration or by centrifugation. The anti-diabetic substance so obtained is a greyish white powder insoluble in distilled water ($p$H of 7.0) or in weak acid but soluble upon addition of a small amount of alkali. It is free of chlorides and free also of protein as determined by the biuret, Millon's, Hopkins-Cole or xantho-proteic reactions.

What I claim as my invention and desire to secure by Letters Patent is:

1. The method of preparing an anti-diabetic substance consisting in passing a suitable fluid under pressure upwardly through macerated pancreas of freshly-killed animals, so that it washes out the anti-diabetic substance generated by the pancreas and purifying and concentrating the fluid so obtained.

2. The method of preparing an anti-diabetic substance consisting in passing weakly acidulated water upwardly through macerated pancreas of freshly-killed animals, so that it washes out the anti-diabetic substance generated by the pancreas, and purifying and concentrating the fluid so obtained.

3. The method of preparing an anti-diabetic substance consisting in stopping at once the destructive action of trypsin by subjecting the pancreas of freshly-killed animals for a time to an acid solution, washing out the anti-diabetic substance generated by the pancreas by a continuous upward movement of the acid solution through the macerated tissue, and purifying and concentrating the fluid so obtained.

4. The method of preparing an anti-diabetic substance consisting in passing weakly acidulated water upwardly through macerated pancreas of freshly-killed animals, so that it washes out the anti-diabetic substance generated by the pancreas and concentration of the material so obtained by precipitation with sodium chloride and subsequent removal of the precipitate.

5. The method of concentrating and purifying the anti-diabetic substance in a fluid obtained by passing weakly acidulated water upwardly through macerated pancreas of freshly-killed animals, consisting in precipitation by means of sodium chloride, removing the precipitate, removing the salt by successive treatment with alcohol, and removing of the alcohol by distillation at a temperature that will not destroy the anti-diabetic substance.

6. A product capable of causing the utilization of sugar in the human system, consisting of the anti-diabetic substance generated by the pancreas obtained in the form of a powder capable of being pressed into a tablet or lozenge and suitable for administration by mouth.

7. A product capable of causing the utilization of sugar in the human system consisting of the anti-diabetic substance generated by the pancreas obtained in the form of a powder which is insoluble in distilled water or in dilute acid but readily soluble in weak alkali, capable of being pressed into a tablet or lozenge, and suitable for administration by mouth.

JOHN R. MURLIN.